(12) United States Patent
Huang et al.

(10) Patent No.: US 11,005,550 B2
(45) Date of Patent: May 11, 2021

(54) METHOD AND APPARATUS FOR TRANSMITTING DOWNLINK CONTROL INFORMATION (DCI)

(71) Applicant: CHINA ACADEMY OF TELECOMMUNICATIONS TECHNOLOGY, Beijing (CN)

(72) Inventors: Qiuping Huang, Beijing (CN); Tamrakar Rakesh, Beijing (CN); Runhua Chen, Beijing (CN); Qiubin Gao, Beijing (CN); Xin Su, Beijing (CN); Hui Li, Beijing (CN); Mengjun Wang, Beijing (CN); Chuanjun Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/623,369

(22) PCT Filed: May 15, 2018

(86) PCT No.: PCT/CN2018/086926
§ 371 (c)(1),
(2) Date: Dec. 16, 2019

(87) PCT Pub. No.: WO2018/228120
PCT Pub. Date: Dec. 20, 2018

(65) Prior Publication Data
US 2020/0195330 A1 Jun. 18, 2020

(30) Foreign Application Priority Data
Jun. 16, 2017 (CN) .......................... 201710459765.5

(51) Int. Cl.
*H04L 12/26* (2006.01)
*H04B 7/06* (2006.01)
(Continued)

(52) U.S. Cl.
CPC ......... *H04B 7/0639* (2013.01); *H04B 7/0421* (2013.01); *H04B 7/0456* (2013.01);
(Continued)

(58) Field of Classification Search
USPC ....... 370/229, 230, 236, 252, 328, 329, 496, 370/522
See application file for complete search history.

(56) References Cited

U.S. PATENT DOCUMENTS

2014/0185483 A1 7/2014 Kim et al.
2017/0126382 A1 5/2017 Chung et al.
(Continued)

FOREIGN PATENT DOCUMENTS

CN 102083223 N 6/2011
CN 102868497 A 1/2013
(Continued)

OTHER PUBLICATIONS

Samsung, "DCI Formats and Contents for NR", 3GPP TSG RAN WG1 Meeting #88bis, R1-1705411,Apr. 7, 2017 (Year: 2017).*
(Continued)

*Primary Examiner* — Nguyen H Ngo
(74) *Attorney, Agent, or Firm* — Kilpatrick Townsend & Stockton, LLP

(57) ABSTRACT

Embodiments of the present application provide a method and apparatus for transmitting downlink control information (DCI), for solving the technical problem that neither the existing protocol nor the communication system has a method for encoding sounding reference signal resource indication (SRI) and pre-coding matrix indication (TPMI) or
(Continued)

rank indication (TRI) information. The method comprises: a network device determines the number of candidate values of preset indication information borne by a preset indication field in the downlink control information (DCI), the preset indication information comprising one of or a combination of two of the sounding reference signal resource indication (SRI) and pre-coding matrix indication (TPMI) or rank indication (TRI) information; the network device determines the length of the preset indication field according to the number of candidate values of the preset indication information, and encodes the preset indication information according to the length to generate the DCI; and the network device sends the DCI to the UE.

9 Claims, 5 Drawing Sheets

(51) Int. Cl.
  *H04B 7/0417* (2017.01)
  *H04B 7/0456* (2017.01)
  *H04L 5/00* (2006.01)
  *H04L 25/02* (2006.01)
  *H04W 72/04* (2009.01)

(52) U.S. Cl.
  CPC ........ *H04L 5/0051* (2013.01); *H04L 25/0226* (2013.01); *H04W 72/042* (2013.01)

(56) References Cited

U.S. PATENT DOCUMENTS

| 2018/0183503 | A1* | 6/2018 | Rahman | H04W 72/042 |
| 2019/0230685 | A1* | 7/2019 | Park | H04W 72/0453 |
| 2020/0015119 | A1* | 1/2020 | Takeda | H04W 28/04 |
| 2020/0083939 | A1* | 3/2020 | Park | H04L 27/26 |
| 2020/0162133 | A1* | 5/2020 | Harrison | H04L 5/0048 |
| 2020/0178220 | A1* | 6/2020 | Kang | H04W 24/10 |

FOREIGN PATENT DOCUMENTS

| CN | 102934381 A | 2/2013 |
| CN | 102938687 A | 2/2013 |
| JP | 2013524615 A | 6/2013 |

OTHER PUBLICATIONS

CMCC, "Discussion on DCI Contents for NR", 3GPP TSG RAN WG1 Meeting #89, R1-1708399, May 19, 2017. (Year: 2017).*
Samsung, "DCI Formats and Contents for NR", 3GPP TSG RAR WG1 Meeting #88bis, R1-1705411, Apr. 7, 2017 (Year: 2017).*
Intel Corporation, "DCI Design Considerations for NR", 3GPP TSG-RAN WG1 #89, R1-1707384, May 19, 2017 (Year: 2017).*
ZTE,"Codebook based UL transmission", 3GPP TSG RAN WG1 Meeting #89, Hangzhou, P.R. China May 15-19, 2017, total 5 pages, R1-1707113.
LG Electronics "Discussion on codebook based transmission for UL", 3GPP TSG-RAN WG1 Meeting#88 bis, Spokane, USA Apr. 3-7, 2017, total 7 pages, R1-1704873.
Ericsson, "UL MIMO Procedures for Codebook Based Transmission", 3GPP TSG-RAN WG1 #89, R1-1708669, May 19, 2017.
Samsung, "DCI Formats and Contents for NR", 3GPP TSG RAN WG1 Meeting #88bis, R1-1705411, Apr. 7, 2017.
CATT, "Discussion on NR DCI Formats", 3GPP TSG RAN WG1 Meeting #89, R1-1707499, May 19, 2017.
CMCC, "Discussion on DCI Contents for NR", 3GPP TSG RAN WG1 Meeting #89, R1-1708399, May 19, 2017.
Intel Corporation, "DCI Design Considerations for NR", 3GPP TSG-RAN WG1 #89, R1-1707384, May 19, 2017.

* cited by examiner

| Codebook index | Number of data streams | |
|---|---|---|
| | $\upsilon = 1$ | $\upsilon = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | - |
| 2 | $\frac{1}{\sqrt{2}}\begin{bmatrix}1\\j\end{bmatrix}$ | - |
| 3 | $\frac{1}{\sqrt{2}}\begin{bmatrix}1\\-j\end{bmatrix}$ | - |
| 4 | $\frac{1}{\sqrt{2}}\begin{bmatrix}1\\0\end{bmatrix}$ | - |
| 5 | $\frac{1}{\sqrt{2}}\begin{bmatrix}0\\1\end{bmatrix}$ | - |

Fig. 2

| TPMI/TRI encoding state | Pre-coding matrix and TRI information |
|---|---|
| 000 | Pre-coding matrix: $\frac{1}{\sqrt{2}}\begin{bmatrix}1\\1\end{bmatrix}$, TRI = 1 |
| 001 | Pre-coding matrix: $\frac{1}{\sqrt{2}}\begin{bmatrix}1\\-1\end{bmatrix}$, TRI = 1 |
| 010 | Pre-coding matrix: $\frac{1}{\sqrt{2}}\begin{bmatrix}1\\j\end{bmatrix}$, TRI = 1 |
| 011 | Pre-coding matrix: $\frac{1}{\sqrt{2}}\begin{bmatrix}1\\-j\end{bmatrix}$, TRI = 1 |
| 100 | Pre-coding matrix: $\frac{1}{\sqrt{2}}\begin{bmatrix}1\\0\end{bmatrix}$, TRI = 1 |
| 101 | Pre-coding matrix: $\frac{1}{\sqrt{2}}\begin{bmatrix}0\\1\end{bmatrix}$, TRI = 1 |
| 110 | Pre-coding matrix: $\frac{1}{\sqrt{2}}\begin{bmatrix}1 & 0\\0 & 1\end{bmatrix}$, TRI = 2 |
| 111 | Reserved (not used temporarily) |

Fig. 3

| Decimal value corresponding to encoding information | SRI、TPMI、TRI labels |
|---|---|
| 0 | SRI= 1、TRI =1、TPMI =1 |
| 1 | SRI= 1、TRI =1、TPMI =2 |
| ... | ... |
| K1 | SRI= 1、TRI =1、TPMI =K1 |
| K1+1 | SRI= 1、TRI =2、TPMI = 1 |
| K1+2 | SRI= 1、TRI =2、TPMI = 2 |
| ... | ... |
| K1+k2 | SRI= 1、TRI =2、TPMI =K2 |
| K1+1 | SRI= 1、TRI =3、TPMI = 1 |
| K1+2 | SRI= 1、TRI =3、TPMI = 2 |
| ... | ... |
| N1 | SRI= 1、TRI =M1、TPMI =KM1 |
| N1+1 | SRI= 2、TRI =1、TPMI =1 |
| N1+2 | SRI= 2、TRI = 1、TPMI = 2 |
| ... | ... |
| P | SRI= 2、TRI =M2、TPMI = X |
| P+1 | SRI= 3、TRI = 1、TPMI =1 |
| ... | ... |

METHOD AND APPARATUS FOR TRANSMITTING DOWNLINK CONTROL INFORMATION (DCI)

The present application is a National Stage of International Application No. PCT/CN2018/086926, filed May 15, 2018, which claims priority to Chinese Patent Application No. 201710459765.5, filed Jun. 16, 2017, both of which are hereby incorporated by reference in their entireties.

FIELD

The embodiments of the present application relates to the field of mobile communications and particularly to a method and an apparatus for transmitting the Downlink Control Information (DCI).

BACKGROUND

In view of an important effect of the Multiple-Input Multiple-Output (MIMO) technology in increasing a peak rate and system spectrum utilization, the Long Term Evolution (LTE), LTE-Advanced (LTE-A) and other wireless access technical standards are all established based on the MIMO and the Orthogonal Frequency Division Multiplexing (OFDM) technologies. The performance gain of the MIMO technology comes from the spatial degree of freedom obtained by a multi-antenna system, so one most important evolution direction of the MIMO technology in the standardization development process is the dimension expansion.

In the LTE Rel-8, at most 4 layer of MIMO transmission can be supported. The Rel-9 puts emphasis on enhancing the Multi-User MIMO (MU-MIMO) technology, and at most 4 downlink data layers can be supported in the MU-MIMO transmission of the Transmission Mode (TM)-8. The Rel-10 introduces the support of 8 antenna ports, to further increase the spatial resolution of the channel state information and further extend the transfer capability of the Single-User MIMO (SU-MIMO) to at most 8 data layers. The Rel-13 and Rel-14 introduce the Full-Dimension MIMO (FD-MIMO) technology supporting 32 ports, to implement the full-dimension and vertical beam-forming.

In order to further improve the MIMO technology, the large-scale antenna technology is introduced into the mobile communication system. For a base station, the fully digital large-scale antenna can have up to 128/256/512 antenna oscillators and up to 128/256/512 transceivers, where each antenna oscillator is connected to one transceiver. A terminal measures channel state information and feeds back by sending pilot signals of up to 128/256/512 antenna ports. The array of antennas with up to 32/64 antenna oscillators may also be configured for the terminal. The huge beam-forming gain is obtained through the beam-formings at the base station and terminal sides, to compensate for the signal attenuation caused by the path loss. Particularly for the high frequency communication, e.g., at a frequency point of 30 GHz, the path loss causes the extremely limited coverage range of the wireless signal. With the large-scale antenna technology, the coverage range of the wireless signal can be extended to the usable range.

In the communication system (such as wireless access, New Radio, 5G or the like), there is a need to consider the Tx beam-forming of the terminal when the terminal performs the uplink transmission in order to obtain the beam-forming gains of the base station and the terminal. In the management process of the uplink beam, the base station can configure many SRS resources for the UE. The terminal sends the Sounding Reference Signal (SRS) by using one or more Tx beams in each SRS resource. After receiving these SRS signals, the base station determines the optimum SRS resource (which corresponds to the Transmit SRS (SRI)) and its corresponding Transmission Precoding Matrix Indicator (TPMI) and Transmission Rank Indicator (TRI) according to channel states corresponding to these SRS signals, and sends them to the terminal for the uplink data transmission of the terminal.

There is no method for encoding SRI and TPMI/TRI information in the existing protocols and communication systems.

SUMMARY

The present application provide a method and an apparatus for transmitting the DCI to solve the technical problem that there is no method for encoding the SRI and the pre-coding matrix indicator/rank indicator information in the existing protocols and communication systems.

A first aspect of the embodiments of the present application provides a method for transmitting the DCI, which includes: determining, by a network device, the number of candidate values of preset indication information borne by a preset indication field in the DCI, the preset indication information including one of or a combination of two of SRI, and TPMI/TRI, information; where the SRI characterizes one of at least one SRS resource configured by the network device for UE, and the TPMI/TRI information characterizes a pre-coding matrix and a rank corresponding to the SRS resource indicated by the SRI; determining, by the network device, a length of the preset indication field according to the number of the candidate values of the preset indication information, and encoding the preset indication information according to the length to generate the DCI; sending, by the network device, the DCI to the UE.

In the above-mentioned solution, the specific implementation method for encoding the SRI and TPMI/TRI is proposed, and specifically the implementations of separately encoding and jointly encoding the SRI and TPMI/TRI are proposed. In the case of separate encoding, the field length required to encode the SRI is determined according to the number of the candidate values of the SRI, and the field length required to encode the TPMI/TRI information is determined according to the number of the candidate values of the TPMI/TRI information; and in the case of joint encoding, the field length required for the joint encoding is determined according to the number of the candidate values of the SRI and the number of the candidate values of the TPMI/TRI information. This solution solves the technical problem that there is no method for encoding the SRI and TPMI/TRI information in the existing protocols and communication systems effectively.

In one embodiment, the preset indication information includes the combination of the SRI and the TPMI/TRI information, the preset indication information characterizes one of the at least one SRS resource configured for the UE as well as the pre-coding matrix and the rank corresponding to the SRS resource indicated by the SRI. Determining, by the network device, the number of candidate values of preset indication information borne by a preset indication field in the DCI signal, includes: determining all values of the SRI, where each value of the SRI characterizes one SRS resource configured for the UE, and different values characterizes different SRS resources; determining the number of pre-coding matrices available to the UE when sending an SRS on the SRS resource characterized by each value of the SRI; summing the numbers of the available pre-coding matrices corresponding to all the values of the SRI to obtain a first sum value; and taking the first sum value as the number of the candidate values of the preset indication information.

In one embodiment, the preset indication information includes the SRI, and determining, by the network device, the number of candidate values of preset indication information borne by a preset indication field in the DCI signal, includes: determining the number of the candidate values of the preset indication information as the total number of the at least one SRS resource configured for the UE; or determining the number of the candidate values of the preset indication information as the maximum number of Tx beam formings supported by the UE; or determining the number of the candidate values of the preset indication information as a preset value.

In one embodiment, the preset indication information includes the TPMI/TRI information, and before determining, by the network device, the number of candidate values of preset indication information borne by a preset indication field in the DCI signal, the method further includes: determining the number of pre-coding matrices available to the UE when sending an SRS on each of the configured at least one SRS resource, and establishing the mapping between the at least one SRS resource and the number of the available pre-coding matrices; and determining, by the network device, the number of candidate values of preset indication information borne by a preset indication field in the DCI signal, includes: determining the target SRS resource indicated by the DCI, determining the number of the available pre-coding matrices corresponding to the target SRS resource according to the mapping, and taking the number of the available pre-coding matrices corresponding to the target SRS resource as the number of the candidate values of the preset indication information.

In one embodiment, the preset indication information includes the TPMI/TRI information, and determining, by the network device, the number of candidate values of preset indication information borne by a preset indication field in the DCI signal, includes: determining the number of pre-coding matrices available to the UE when sending an SRS on each of the configured at least one SRS resource, determining the maximum of the numbers of the available pre-coding matrices determined according to the at least one SRS resource configured for the UE, and taking the maximum number as the number of the candidate values of the preset indication information.

In one embodiment, the preset indication information includes the TPMI/TRI information, and determining, by the network device, the number of candidate values of preset indication information borne by a preset indication field in the DCI signal, includes: determining the number of the antenna ports corresponding to each of the at least one SRS resource configured for the UE; determining the SRS resource corresponding to the maximum number of the antenna ports in the at least one SRS resource configured for the UE; and determining the number of the pre-coding matrices available to the UE when sending the SRS on the SRS resource corresponding to the maximum number of the antenna ports as the number of the candidate values of the preset indication information.

In one embodiment, the determining a pre-coding matrix available to the UE when sending an SRS on each of the configured at least one SRS resource, includes: determining all values of TRI corresponding to the first SRS resource that is any one of the at least one SRS resource configured for the UE; determining the number of available pre-coding matrices corresponding to each value of the TRI; and determining the number of pre-coding matrices available to the UE when sending an SRS on the first SRS resource according to the number of the available pre-coding matrices corresponding to each value of the TRI.

In one embodiment, the determining all values of TRI corresponding to the first SRS resource, includes: determining all the values of the TRI corresponding to the first SRS resource according to the number of antenna ports corresponding to the first SRS resource; or determining all the values of the TRI corresponding to the first SRS resource according to the maximum number of data streams supported by the UE; or determining all the values of the TRI corresponding to the first SRS resource according to the number of data streams configured by the network device for the UE.

In one embodiment, the determining an available pre-coding matrix corresponding to each value of the TRI, includes: determining the available pre-coding matrix corresponding to each value of the TRI according to the number of antenna ports corresponding to the first SRS resource or the maximum number of antenna ports allowed by the UE.

In one embodiment, the determining the number of pre-coding matrices available to the UE when sending an SRS on the first SRS resource according to the number of the available pre-coding matrices corresponding to each value of the TRI, includes: summing the numbers of the available pre-coding matrices corresponding to all the values of the TRI to obtain the second sum value according to the number of the available pre-coding matrices corresponding to each value of the TRI, and taking the second sum value as the number of the pre-coding matrices available to the UE when sending the SRS on the first SRS resource; or determining the maximum value of the numbers of the available pre-coding matrices corresponding to all the values of the TRI according to the number of the available pre-coding matrices corresponding to each value of the TRI, multiplying the maximum value by the number of all the values of the TRI to obtain the first product, and taking the first product as the number of the pre-coding matrices available to the UE when sending the SRS on the first SRS resource.

A second aspect of the embodiments of the present application provides a method for transmitting the DCI, which includes: determining, by a network device, the number of candidate values of preset indication information borne by a preset indication field in the DCI, the preset indication information including TPMI/TRI information or the combination of SRI and TPMI/TRI information; where the SRI characterizes one of at least one SRS resource configured by the network device for a User Equipment, UE, and the TPMI/TRI information characterizes a pre-coding matrix and a rank corresponding to the SRS resource indicated by the SRI; determining, by the network device, the length of the preset indication field according to the number of the candidate values of the preset indication information, and encoding the preset indication information according to the length to generate the DCI; and sending, by the network device, the DCI to the terminal.

In one embodiment, the preset indication information includes the TPMI/TRI information, and determining the number of candidate values of preset indication information borne by a preset indication field in the DCI, specifically includes: determining the possible number of the values of the preset indication information according to the number of antenna ports corresponding to the SRI indicated by the DCI or the maximum number of antenna ports allowed by the UE.

In one embodiment, the preset indication information includes the combination of the SRI and the TPMI/TRI information, and determining the number of candidate values of preset indication information borne by a preset indication field in the DCI, specifically includes: determining the possible number of the values of the preset indication information according to the possible number of the values of the SRI and the number of antenna ports corresponding to each value of the SRI; or determining the possible number of the values of the preset indication information according to the possible number of the values of the SRI and the maximum number of antenna ports allowed by the UE.

A third aspect of the embodiments of the present application provides a method for receiving the DCI, which includes: determining, by a UE, the number of candidate values of preset indication information borne by a preset indication field in the DCI, the preset indication information including one of or a combination of two of SRI, and TPMI/TRI, information; where the SRI characterizes one of at least one SRS resource configured by the network device for a User Equipment, UE, and the TPMI/TRI information characterizes a pre-coding matrix and a rank corresponding to the SRS resource indicated by the SRI; determining, by the UE, the length of the preset indication field according to the number of the candidate values of the preset indication information; and receiving, by the UE, the DCI according to the length of the preset indication field.

A fourth aspect of the embodiments of the present application provides an apparatus for transmitting the DCI, which includes: a first determining device configured to determine the number of candidate values of preset indication information borne by a preset indication field in the DCI, the preset indication information including one of or a combination of two of SRI and TPMI/TRI, information; where the SRI characterizes one of at least one SRS resource configured by the apparatus for a UE, and the TPMI/TRI information characterizes a pre-coding matrix and a rank corresponding to the SRS resource indicated by the SRI; a first encoding device configured to determine the length of the preset indication field according to the number of the candidate values of the preset indication information and encode the preset indication information according to the length to generate the DCI; and a first sending device configured to send the DCI to the UE.

In one embodiment, the preset indication information includes the combination of the SRI and the TPMI/TRI information, the preset indication information characterizes one of the at least one SRS resource configured for the UE as well as the pre-coding matrix and the rank corresponding to the SRS resource indicated by the SRI; and the first determining device is configured to: determine all values of the SRI, where each value of the SRI characterizes one SRS resource configured for the UE, and different values characterizes different SRS resources; determine the number of the pre-coding matrices available to the UE when sending the SRS on the SRS resource characterized by each value of the SRI; sum the numbers of the available pre-coding matrices corresponding to all the values of the SRI to obtain a first sum value; and take the first sum value as the number of the candidate values of the preset indication information.

In one embodiment, the preset indication information includes the SRI; and the first determining device is configured to: determine the number of the candidate values of the preset indication information as the total number of the at least one SRS resource configured for the UE; or determine the number of the candidate values of the preset indication information as the maximum number of the Tx beam formings supported by the UE; or determine the number of the candidate values of the preset indication information as a preset value.

In one embodiment, the preset indication information includes the TPMI/TRI information; and the first determining device is configured to: determine the number of the pre-coding matrices available to the UE when sending the SRS on each of the configured at least one SRS resource, and establish the mapping between the at least one SRS resource and the number of the available pre-coding matrices before determining the number of the candidate values of the preset indication information borne by the preset indication field in the DCI signal; determine the target SRS resource indicated by the DCI; determine the number of the available pre-coding matrices corresponding to the target SRS resource according to the mapping; and take the number of the available pre-coding matrices corresponding to the target SRS resource as the number of the candidate values of the preset indication information.

In one embodiment, the preset indication information includes the TPMI/TRI information; and the first determining device is configured to: determine the number of the pre-coding matrices available to the UE when sending the SRS on each of the configured at least one SRS resource, determine the maximum of the numbers of the available pre-coding matrices determined according to the at least one SRS resource configured for the UE, and take the maximum number as the number of the candidate values of the preset indication information.

In one embodiment, the preset indication information includes the TPMI/TRI information; and the first determining device is configured to: determine the number of the antenna ports corresponding to each of the at least one SRS resource configured for the UE; determine the SRS resource corresponding to the maximum number of the antenna ports in the at least one SRS resource configured for the UE; and determine the number of the pre-coding matrices available to the UE when sending the SRS on the SRS resource corresponding to the maximum number of the antenna ports as the number of the candidate values of the preset indication information.

In one embodiment, the first determining device is configured to: determine all the values of the TRI corresponding to the first SRS resource that is any one of the at least one SRS resource configured for the UE; determine the number of the available pre-coding matrices corresponding to each value of the TRI; and determine the number of the pre-coding matrices available to the UE when sending the SRS on the first SRS resource according to the number of the available pre-coding matrices corresponding to each value of the TRI.

In one embodiment, the first determining device is configured to: determine all the values of the TRI corresponding to the first SRS resource according to the number of the antenna ports corresponding to the first SRS resource; or determine all the values of the TRI corresponding to the first SRS resource according to the maximum number of the data streams supported by the UE; or determine all the values of the TRI corresponding to the first SRS resource according to the number of the data streams configured by the apparatus for the UE.

In one embodiment, the first determining device is configured to: determine the available pre-coding matrix corresponding to each value of the TRI according to the number of the antenna ports corresponding to the first SRS resource or the maximum number of the antenna ports allowed by the UE.

In one embodiment, the first determining device is configured to: sum the numbers of the available pre-coding matrices corresponding to all the values of the TRI to obtain a second sum value according to the number of the available pre-coding matrices corresponding to each value of the TRI, and take the second sum value as the number of the pre-coding matrices available to the UE when sending the SRS on the first SRS resource; or determine the maximum value of the numbers of the available pre-coding matrices corresponding to all the values of the TRI according to the number of the available pre-coding matrices corresponding to each value of the TRI, multiply the maximum value by the number of all the values of the TRI to obtain a first product, and take the first product as the number of the pre-coding matrices available to the UE when sending the SRS on the first SRS resource.

A fifth aspect of the embodiments of the present application provides an apparatus for transmitting the DCI, which includes: a second determining device configured to determine the number of candidate values of preset indication information borne by a preset indication field in the DCI, the preset indication information including TPMI/TRI information or the combination of SRI and TPMI/TRI information; where the SRI characterizes one of at least one SRS resource configured by the apparatus for UE, and the TPMI/TRI information characterizes a pre-coding matrix and a rank corresponding to the SRS resource indicated by the SRI; a second encoding device configured to determine the length of the preset indication field according to the number of the candidate values of the preset indication information and encode the preset indication information according to the length to generate the DCI; and a second sending device configured to send the DCI to the UE.

In one embodiment, the preset indication information includes the TPMI/TRI information; and the second determining device is configured to: determine the possible number of the values of the preset indication information according to the number of the antenna ports corresponding to the SRI indicated by the DCI or the maximum number of the antenna ports allowed by the UE.

In one embodiment, the preset indication information includes the combination of the SRI and the TPMI/TRI information; and the second determining device is configured to: determine the possible number of the values of the preset indication information according to the possible number of the values of the SRI and the number of the antenna ports corresponding to each value of the SRI; or determine the possible number of the values of the preset indication information according to the possible number of the values of the SRI and the maximum number of the antenna ports allowed by the UE.

A sixth aspect of the embodiments of the present application provides an apparatus for receiving the DCI, which includes: a third determining device configured to determine the number of candidate values of preset indication information borne by a preset indication field in the DCI, the preset indication information including one of or a combination of two of Sounding reference signal SRI, and TPMI/TRI information; where the SRI characterizes one of at least one SRS resource configured by the network device for a User Equipment, UE, and the TPMI/TRI information characterizes a pre-coding matrix and a rank corresponding to the SRS resource indicated by the SRI; and a receiving device configured to receive the DCI according to the length of the preset indication field.

A seventh aspect of the embodiments of the present application provides a device for transmitting the DCI, which includes: a memory configured to store program instructions; a processor configured to invoke the program instructions stored in the memory, and in accordance with the obtained program, perform: determining the number of candidate values of preset indication information borne by a preset indication field in the DCI, the preset indication information including one of or a combination of two of Sounding reference signal Resource Indicator, SRI, and Pre-coding Matrix Indicator, TPMI/Rank Indicator, TRI, information; wherein the SRI characterizes one of at least one SRS resource configured by the network device for a User Equipment, UE, and the TPMI/TRI information characterizes a pre-coding matrix and a rank corresponding to the SRS resource indicated by the SRI; determining a length of the preset indication field according to the number of the candidate values of the preset indication information, and encoding the preset indication information according to the length to generate the DCI; sending the DCI to the UE.

An eighth aspect of the embodiments of the present application provides a device for receiving the DCI, which includes: a memory configured to store program instructions; a processor configured to invoke the program instructions stored in the memory, and in accordance with the obtained program, perform: determining the number of candidate values of preset indication information borne by a preset indication field in the DCI, the preset indication information including one of or a combination of two of Sounding reference signal Resource Indicator, SRI, and Pre-coding Matrix Indicator, TPMI/Rank Indicator, TRI, information; wherein the SRI characterizes one of at least one SRS resource configured by the network device for a User Equipment, UE, and the TPMI/TRI information characterizes a pre-coding matrix and a rank corresponding to the SRS resource indicated by the SRI; determining a length of the preset indication field according to the number of the candidate values of the preset indication information; receiving the DCI according to the length of the preset indication field.

A ninth aspect of the embodiments of the present application provides a computer storage medium storing the computer executable instructions which are configured to cause the computer to perform any one of the abovementioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

FIG. 2 is a schematic diagram of a pre-coded codebook in embodiments of the present application.

FIG. 3 is a schematic diagram of the coding of TPMI/TRI information in embodiments of the present application.

DETAILED DESCRIPTION OF THE EMBODIMENTS

Figure 1:
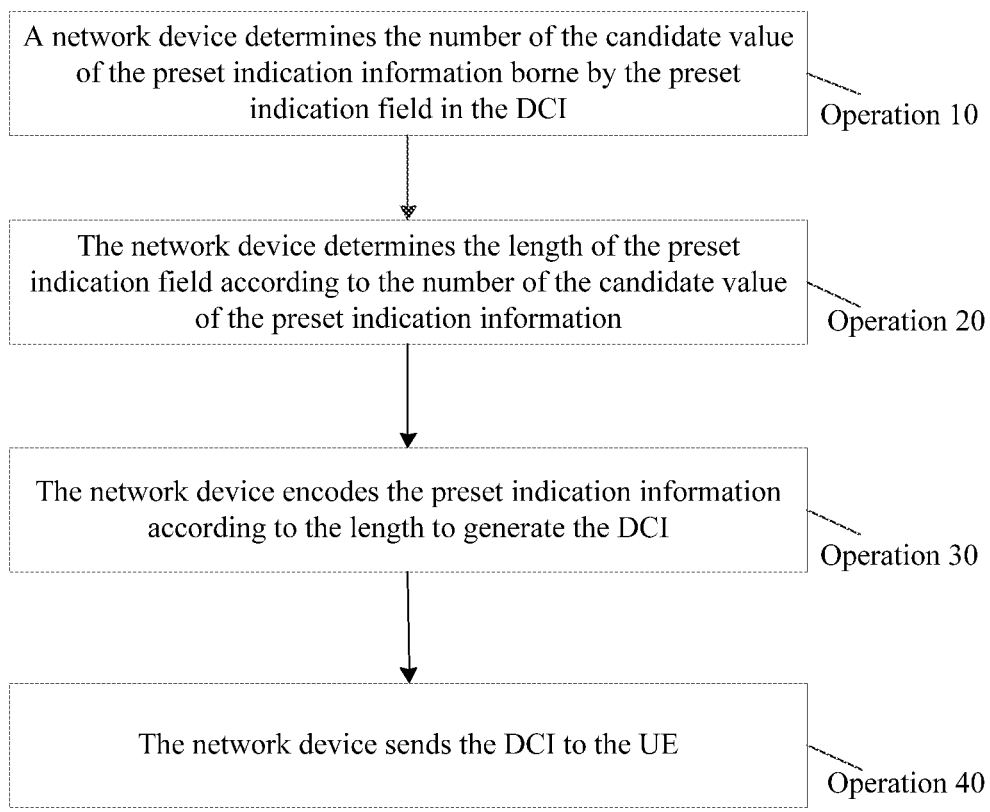
FIG. 1 is a schematic flow chart of a method for transmitting DCI according to embodiments of the present application.

The technical solutions of the embodiments of the present application will be illustrated below in details by way of the drawings and specific embodiments. It shall be understood that the embodiments of the present application and the specific features in the embodiments are intended to illustrate the technical solutions of the embodiments of the present application in details but not limit the technical solutions of the embodiments of the present application, and the embodiments of the present application and the specific features in the embodiments can be combined with each other without collision.

The embodiments of the present application are applicable to the 5G system, and may also be applicable to other wireless communication systems, e.g., Long Term Evolution (LTE) system, Global System for Mobile Communication (GSM), Universal Mobile Telecommunications System (UMTS), Code Division Multiple Access (CDMA) system, new network device systems and the like.

The UE involved in the embodiments of the present application can refer to the device for providing the voice and/or data connectivity to the user, the handheld device with the wireless connection function, or other processing device connected to the wireless modem.

The wireless user equipment can communicate with one or more core networks via the Radio Access Network (RAN), and the wireless user equipment can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network.

For example, Personal Communication Service (PCS) telephone, cordless telephone, Session Initiation Protocol (SIP) telephone, Wireless Local Loop (WLL) station, Personal Digital Assistant (PDA) and other devices.

The wireless user equipment can also be called system, Subscriber Unit, Subscriber Station, Mobile Station, Mobile, Remote Station, Access Point, Remote Terminal, Access Terminal, User Terminal, User Agent, User Device, etc.

The base station involved in the embodiments of the present application can be used to perform the inter-conversion between the received air frame and the IP packet, and used as the router between the wireless user equipment and the rest of the access network, where the rest of the access network may include Internet Protocol (IP) network devices.

The base station can further coordinate the attribute management of the air interface. For example, the base station can be the network device in the 5G system, such as Next generation Node B (gNB), Base Transceiver Station (BTS) in the GSM or CDMA, or NodeB in the Wideband Code Division Multiple Access (WCDMA), or evolutional Node B (eNB or e-NodeB) in the LTE, which is not limited by the embodiments of the present application.

It shall be understood that the words such as "first" or "second" in the description of the embodiments of the present application is only for purpose of distinguishing the description, and cannot be construed to indicate or imply the relative importance and cannot be construed to indicate or imply the order either. In the description of the embodiments of the present application, "a plurality of" refers to two or more.

A First Embodiment

In the 5G system, a network device configures many SRS resources for a UE. Before the UE sends uplink data, the network device needs to send control information related to the uplink data to the UE, where the control information includes the SRI or pre-coding matrix indicator/rank indicator information. The control information is contained in the downlink data sent by the network device to the UE, e.g., is contained in DCI. But there is no method for encoding the SRI and the pre-coding matrix indicator/rank indicator information in the existing protocols and communication systems.

The first embodiment of the present application provides a method for transmitting the DCI to solve the technical problem that there is no method for encoding the SRI and TPMI/TRI information in the existing protocols and communication systems. Referring to FIG. 1, the method includes the following operations.

Operation 10: a network device determines the number of candidate values of preset indication information borne by a preset indication field in the DCI. The number of the candidate values may be one or more.

Specifically, the preset indication information is SRI, or TPMI/TRI information, or a combination of the SRI and TPMI/TRI information, which is not limited specifically by the embodiments of the present application.

If the preset indication information includes the SRI, the number of the candidate values of the SRI is determined. Each value of the SRI indicates one SRS resource, and different values indicate different SRS resources.

If the preset indication information includes the TPMI/TRI information, the number of the candidate values of the TPMI/TRI information is determined.

If the preset indication information includes a combination of the SRI and TPMI/TRI information, the number of the candidate values of the SRI and the number of the candidate values of the TPMI/TRI information are determined respectively. Then the number of the candidate values of the preset indication information is determined according to the determined number of the candidate values of the SRI and the determined number of the candidate values of the TPMI/TRI information.

Operation 20: the network device determines a length of a preset indication field according to the number of the candidate values of the preset indication information.

Specifically after the number of the candidate values of the preset indication information is determined, the length of the preset indication field is calculated according to the number of the candidate values of the preset indication information.

In a specific implementation process, the method of calculating the length of the preset indication field according to the number of the candidate values of the preset indication information needs to be determined according to the encoding way employed actually in the 5G system, and is not limited specifically in the embodiments of the present application.

For example, the encoding way is binary, and it is assumed that the determined number of the candidate values of the preset indication information is M, then the length of the preset indication field is $\lceil \log_2 M \rceil$. For example, it is assumed that the determined number of the candidate values of the preset indication information is 8, then the length of the preset indication field is 3 bits. It is assumed that the determined number of the candidate values of the preset indication information is 3, then the length of the preset indication field is 2 bits.

In the following description of the embodiments of the present application, the methods provided by the embodiments of the present application will be illustrated below in details by taking the case that the encoding way is the binary way as an example.

Operation 30: the network device encodes the preset indication information according to the length to generate DCI.

Operation: the network device sends the DCI to UE.

Now for three cases in which the preset indication information in the above operation 30 is the SRI, the TPMI/TRI information and the combination thereof respectively, the specific processes of implementing the encoding will be introduced respectively.

(1) If the preset indication information includes the SRI, all the candidate values of the SRI are encoded on the preset indication field, where one encoding information on the preset indication field characterizes one SRI value, that is, one encoding information on the preset indication field indicates one SRS resource, and different encoding information indicates different SRI values, that is, different encoding information indicates different SRS resources.

For example, if the number of the candidate values of the SRI is 3, the length of the preset indication field is 2 bits, where the candidate values of the SRI include "2", "7" and "8", so the encoding information "00" may be used to characterize the candidate value "2" of the SRI, the encoding information "01" may be used to characterize the candidate value "7" of the SRI, and the encoding information "10" may be used to characterize "8".

Of course, there can also be other forms of correspondence between the respective encoding information and the respective candidate values of the SRI described above. This example here is merely used to illustrate there is a one-to-one correspondence between the encoding information and the candidate value of the SRI, but cannot be used to limit the candidate value of the SRI as well as the specific rule of correspondence between the encoding information and the candidate value of the SRI, which depend on the actual situation.

(2) If the preset indication information includes the TPMI/TRI information, all the candidate values of the TPMI/TRI information are encoded on the preset indication field. Encoding information on the preset indication field characterizes one candidate value of the TPMI/TRI information, and one candidate value of the TPMI/TRI information characterizes one specific pre-coding matrix. In the case that the SRI and the pre-coding codebook used by the UE are determined, the values of the TPMI/TRI information borne by the DCI are different, so the pre-coding matrices characterized by the TPMI/TRI information are different.

For example, for the determined SRI, a pre-coding codebook corresponding to a SRS resource can be determined according to the number of antenna ports of the SRS resource corresponding to this SRI.

It is assumed that the determined number of the antenna ports is 2. Then the candidate values of the TRI are 1 and 2. It is assumed that the allowed number of the candidate values of the TPMI/TRI information is 3 and the three values of the TPMI/TRI information correspond to "TRI=1, pre-coding matrix is $$\frac{1}{\sqrt{2}}\begin{bmatrix}1\\1\end{bmatrix}'',$$

"TRI=2, pre-coding matrix is $$\frac{1}{\sqrt{2}}\begin{bmatrix}1&0\\0&1\end{bmatrix}''$$

and "TRI=1, pre-coding matrix is $$\frac{1}{\sqrt{2}}\begin{bmatrix}0\\1\end{bmatrix}''$$

respectively, then the three values of the TPMI/TRI information can be encoded by using the field with the length of 2 bits, for example, the encoding information "00" characterizes "TRI=1, pre-coding matrix is $$\frac{1}{\sqrt{2}}\begin{bmatrix}1\\1\end{bmatrix}'',$$

the encoding information "01" characterizes "TRI=2, pre-coding matrix is $$\frac{1}{\sqrt{2}}\begin{bmatrix}1&0\\0&1\end{bmatrix}'',$$

and the encoding information "10" characterizes "TRI=1, pre-coding matrix is $$\frac{1}{\sqrt{2}}\begin{bmatrix}0\\1\end{bmatrix}''.$$

Of course, there can also be other forms of correspondence between the encoding information and the candidate value of the TPMI/TRI information. This example here is merely used to illustrate there is the one-to-one correspondence between the encoding information and the candidate value of the TPMI/TRI information, but cannot be used to limit the specific rule of correspondence between the encoding information and the candidate value of the TPMI/TRI information.

For the determined SRI, the pre-coding codebook corresponding to the SRS resource can be determined according to the number of the antenna ports of the SRS resource corresponding to this SRI. It is assumed that the number of the antenna ports of the SRS resource corresponding to the SRI is 2. According to the pre-coding codebook illustrated in FIG. 2, the candidate values of the TRI are 1 and 2, and the candidate values of the TPMI are seven pre-coding matrices in FIG. 2. Then the number of the candidate values of the TPMI/TRI is 7. We can use the field with the length of 3 bits to encode these seven possible TPMI/TRI information. For example, the way as shown in FIG. 3 is employed.

It is necessary to note that the way of encoding the TPMI/TRI information introduced above is based on the case of jointly encoding the TPMI and TRI, that is, one candidate value of the TPMI/TRI can characterize one TPMI value and one TRI value.

In the practical application, the TPMI and TRI can also be encoded separately. In the case of separately encoding the TPMI and TRI, there is a need to specify two preset indication fields on the DCI to bear the TRI and TPMI respectively, and one specific pre-coding matrix is determined jointly according to two encoding information on the two preset indication fields. The specific implementations of separately encoding and jointly encoding the TPMI and TRI can refer to the related implementation solutions in the prior art, and will be omitted here.

Figures 4, 5:
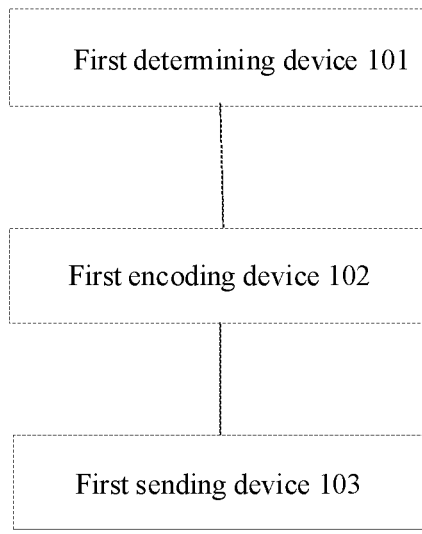
FIG. 4 is a schematic diagram of the coded information in case of joint encoding in embodiments of the present application.
FIG. 5 is a schematic flow chart of an apparatus for transmitting the DCI according to embodiments of the present application.

(3) If the preset indication information includes the combination of the SRI and the TPMI/TRI information, the SRI and the TPMI/TRI information are encoded jointly on the preset indication field, that is, all the candidate values of the SRI and the TPMI/TRI information are encoded on the preset indication field. One value of the preset indication information characterizes the value of the SRI or one combination of the values of the TPMI and TRI, that is, one value of the preset indication information corresponds to one specific combination of the SRS resource and the pre-coding matrix, and different values of the preset indication information characterize different combinations of the SRS resource and the pre-coding matrix. For example, as shown in FIG. 4, SRI=1, TPMI=1, and TRI=1 when the decimal value corresponding to the encoding information is 0.

In the above-mentioned solutions, the specific implementation method for encoding the SRI and TPMI/TRI is proposed, and specifically the implementations of separately encoding and jointly encoding the SRI and TPMI/TRI are proposed. In the case of separate encoding, the field length required to encode the SRI is determined according to the number of the candidate values of the SRI, and the field length required to encode the TPMI/TRI information is determined according to the number of the candidate values of the TPMI/TRI information; and in the case of joint encoding, the field length required for the joint encoding is determined according to the number of the candidate values of the SRI and the number of the candidate values of the TPMI/TRI information. This solution solves the technical problem that there is no method for encoding the SRI and TPMI/TRI information in the existing protocols and communication systems effectively.

In one embodiment, when the SRI or the TPMI/TRI information or the combination of the SRI and the TPMI/TRI information is encoded, there may be many ways of implementing the rules of defining the encoding information. By taking the joint encoding as an example, as the values of the encoding information are increased, the labels may be increased in the order of TRI, TPMI and SRI, or the labels may be increased in the order of SRI, TPMI and TRI, or the labels may be increased in the order of TPMI, TRI, SRI, etc., which is not limited specifically in the embodiments of the present application.

In this way, the technical solutions for encoding the SRI and TPMI/TRI information are further perfected.

In one embodiment, after determining the rule of defining the encoding information, the network device can generate a corresponding mapping table between the encoding information and the preset indication information, and notify the UE of the generated mapping table or notify the UE of the way of generating the mapping table. By taking the joint encoding as an example, the network device can use the values of the SRI, TPMI and TRI corresponding to each encoding information to generate the mapping table, for example as shown in FIG. 3, and notify the UE of the generated mapping table or notify the UE of the way of generating the mapping table, so that the UE can read out the values of the SRI, TPMI and TM quickly when receiving the DCI.

In this way, the technical solutions for encoding the SRI and TPMI/TRI information are further perfected.

In one embodiment, the specific implementation ways of determining the number of the candidate values of the preset indication information borne by the preset indication field in the DCI described in the above operation 10 include three cases as follows.

First case: when the preset indication information includes the SRI, the way of determining the number of the candidate values of the preset indication information includes but not limited to: determining the number of the candidate values of the SRI as the total number of the at least one SRS resource configured for the UE; or determining the number of the candidate values of the SRI as the maximum number of the Tx beam formings supported by the UE; or determining the number of the candidate values of the SRI as a preset value.

Here, the preset value can be self-defined by the base station or can be specified by the related protocol in the 5G system, which is not limited specifically by the embodiments of the present application. If it is the preset value, the length of the field on the DCI corresponding to the preset value needs to be pre-agreed by the base station and the terminal (e.g., specified in the protocol) or informed by the base station to the terminal via the signalling.

It shall be noted that when the number of the candidate values of the SRI is the preset value and the network device needs to inform the terminal of the length of the field on the DCI corresponding to the preset value via the signalling, the implementation way can be to inform the UE via the high-level signalling or via the DCI, which is not limited specifically by the embodiments of the present application.

It shall be noted that the case of determining the number of the candidate values of the SRI as the total number of the at least one SRS resource configured for the UE is directed to the uplink transmission mode of the UE. At this time, the total number of the at least one SRS resource configured for the UE means the total number of the at least one SRS resource configured for the UE in the uplink transmission mode.

Second case: when the preset indication information includes the pre-coding indicator information, the way of determining the number of the candidate values of the preset indication information can include but not limited to the following ways.

(1) The number of the candidate values of the TPMI/TRI information corresponding to each SRS resource is independent of the values of the SRI, and different SRS resources correspond to the same number of the candidate values of the preset indication information.

For example, in the case that all the values of the SRI are determined, all the SRS resources corresponding to all the values of the SRI are determined; the number of the available pre-coding matrices in sending the uplink data on each of all the SRS resources is then determined; the maximum of the numbers of available pre-coding matrices determined according to all the SRS resources is then determined; and the maximum number is taken as the number of the candidate values of the pre-coding indication information corresponding to each SRS resource.

In another example, in the case that all the values of the SRI are determined, all the SRS resources corresponding to all the values of the SRI are determined; the number of the antenna ports corresponding to each of all the SRS resources is then determined; the SRS resource of which the number of the antenna ports is largest; and the number of the available pre-coding matrices corresponding to the SRS resource of which the number of the antenna ports is largest is taken as the number of the candidate values of the pre-coding indication information corresponding to each SRS resource.

In yet another example, the network device can directly configure the number of the candidate values of the pre-coding indication information corresponding to each SRS resource as the same predetermined value, and notify the UE of the predetermined value or the field length corresponding to the predetermined value. The implementation way can be to inform the UE via the high-level signalling or via the DCI, which is not limited specifically by the embodiments of the present application. The predetermined value can be self-defined by the network device or can be specified by the related protocol in the 5G system, which is not limited specifically by the embodiments of the present application.

(2) The number of the candidate values of the TPMI/TRI information corresponding to each SRS resource is related to the values of the SRI, and the numbers of the candidate values of the preset indication information corresponding to different SRS resources can be different.

In a specific implementation process, in the case that all the values of the SRI are determined, all the SRS resources corresponding to all the values of the SRI are determined; the number of the available pre-coding matrices in sending the uplink data on each of all the SRS resources is then determined; the mapping between the SRS resource and the number of the available pre-coding matrices is established and stored; and the number of the available pre-coding matrices corresponding to the target SRS resource can be determined directly according to the mapping when the target SRS resource indicated by the DCI signal are different.

Third case: when the preset indication information includes the combination of the SRI and the TPMI/TRI information, the way of determining the number of the candidate values of the preset indication information can be as follows: determining all the values of the SRI; determining all the SRS resources corresponding to all the values of the SRI; determining the number of the available pre-coding matrices in sending the uplink data on each of all the SRS resources; summing the numbers of the pre-coding matrices determined according to all the values of the SRI to obtain a first sum value; and taking the first sum value as the number of the candidate values of the preset indication information.

In this way, many implementation methods of determining the number of the candidate values of the SRI, the number of the candidate values of the TPMI/TRI information, and the number of the candidate values of the combination of the SRI and TPMI/TRI information are proposed, to further perfect the technical solutions for encoding the SRI and TPMI/TRI information.

In one embodiment, the determining the number of the available pre-coding matrices in sending the uplink data on each of all the SRS resources includes: determining all the values of the TRI corresponding to the first SRS resource in all the SRS resources, where the first SRS resource is any one of all the SRS resources; determining the number of the available pre-coding matrices corresponding to each value of the TRI; and determining the number of the available pre-coding matrices in sending the uplink data on the first SRS resource according to the number of the available pre-coding matrices corresponding to each value of the TRI.

In this way, the number of the available pre-coding matrices in sending the uplink data on each SRS resource can be determined to further perfect the technical solutions for encoding the SRI and TPMI/TRI information.

In one embodiment, there can be many implementation methods of determining all the values of the TRI corresponding to the first SRS resource, including but not limited to the following five types.

(1) All the values of the TRI corresponding to the first SRS resource are determined according to the number of the antenna ports corresponding to the first SRS resource. For example, if the number of the antenna ports corresponding to the first SRS resource is N, the values of the TRI corresponding to the first SRS resource can only be a positive integer greater than or equal to 1 and less than or equal to N.

(2) All the values of the TRI corresponding to the first SRS resource are determined according to the maximum number of the data streams supported by the UE. For example, the maximum capacity of data transmission of the UE is at most 2 streams, so even if the number of the antenna ports corresponding to the first SRS resource is greater than 2 (e.g., 4), the value of the TRI corresponding to the first SRS resource can only be "1" or "2".

(3) All the values of the TRI corresponding to the first SRS resource are determined according to the number of the data streams configured by the network device for the UE. For example, the number of data streams configured by the network device via the high-level signalling for the UE can only be "2" and "4", so all the values of the TRI corresponding to the first SRS resource can only be "2" or "4".

(4) All the values of the TRI corresponding to the first SRS resource are determined according to the number of the antenna ports corresponding to the first SRS resource and the maximum number of the data streams supported by the UE. For example, the number of the antenna ports corresponding to the first SRS resource is N, but the maximum capacity of data transmission of the UE is at most M, and M<N, so the values of the TRI corresponding to the first SRS resource can only be a positive integer greater than or equal to 1 and less than or equal to M.

(5) All the values of the TRI corresponding to the first SRS resource are determined according to the number of the data streams configured by the network device for the UE and the number of the antenna ports corresponding to the first SRS resource. For example, the number of data streams configured by the network device via the high-level signalling for the UE can only be "2" and "4", and the number of the antenna ports corresponding to the first SRS resource is M, so the values of the TRI corresponding to the first SRS resource can only be the allowed number of the data streams which is less than M, for example, when M=2, the value of the TRI can only be "2".

In this way, all the values of the TRI corresponding to the SRS resource can be determined in many ways, to further perfect the technical solutions for encoding the SRI and TPMI/TRI information.

In one embodiment, the determining the available pre-coding matrix corresponding to each value of the TRI includes: determining the available pre-coding matrix corresponding to each value of the TRI according to the number of the antenna ports corresponding to the first SRS resource or the maximum number of the antenna ports allowed by the UE.

Here, the maximum number of the antenna ports allowed by the UE can be the maximum number of the antenna ports configured by the base station for the terminal, or can be specified in the protocol. For example, if the protocol specifies that the SRS transmissions of only {1, 2, 4} antenna ports are allowed, the maximum number of the antenna ports allowed by the UE is 4.

Specifically, the available pre-coding codebook in sending the uplink data by using the first SRS resource can be determined according to the number of the antenna ports corresponding to the first SRS resource or the maximum number of the antenna ports allowed by the UE.

In one embodiment, the determining the number of the available pre-coding matrices in sending the uplink data on the first SRS resource according to the number of the available pre-coding matrices corresponding to each value of the TRI, includes but not limited to the following two implementations.

(1) Summing the numbers of the available pre-coding matrices corresponding to all the values of the TRI according to the number of the available pre-coding matrices corresponding to each value of the TRI to obtain a second sum value, and taking the second sum value as the number of the available pre-coding matrices in sending the uplink data on the first SRS resource.

(2) Determining the maximum value of the numbers of the available pre-coding matrices corresponding to all the values of the TRI according to the number of the available pre-coding matrices corresponding to each value of the TRI, multiplying the maximum value by the number of all the values of the TRI to obtain a first product, and taking the first product as the number of the available pre-coding matrices in sending the uplink data on the first SRS resource.

In this way, when the SRS resource and all the values of the TRI corresponding to the SRS resource are determined, the number of the available pre-coding matrices corresponding to each value of the TRI can be determined in many ways, and thus the number of the available pre-coding matrices in sending the uplink data on the SRS resource is determined, to further perfect the technical solutions for encoding the SRI and TPMI/TRI information.

Second Embodiment

The second embodiment of the present application provides a method for transmitting the DCI, and this method is one of the specific cases of the first embodiment described above.

Specifically, the method includes: a network device determines the number of the candidate values of the preset indication information borne by the preset indication field in the DCI, the preset indication information including the TPMI/TRI information or the combination of the SRI and TPMI/TRI information; where the SRI characterizes one of the at least one SRS resource configured by the network device for a UE, and the TPMI/TRI information characterizes the pre-coding matrix and the rank corresponding to the SRS resource indicated by the SRI; the network device determines the length of the preset indication field according to the number of the candidate values of the preset indication information, and encodes the preset indication information according to the length to generate the DCI; the network device sends the DCI to the terminal.

In one embodiment, the preset indication information includes the TPMI/TRI information, and the determining the number of the candidate values of the preset indication information borne by the preset indication field in the DCI, includes: determining the possible number of the values of the preset indication information according to the number of the antenna ports corresponding to the SRI indicated by the DCI or the maximum number of the antenna ports allowed by the UE.

In one embodiment, the preset indication information includes the combination of the SRI and the TPMI/TRI information, and the determining the number of the candidate values of the preset indication information borne by the preset indication field in the DCI, includes: determining the possible number of the values of the preset indication information according to the possible number of the values of the SRI and the number of the antenna ports corresponding to each value of the SRI; or determining the possible number of the values of the preset indication information according to the possible number of the values of the SRI and the maximum number of the antenna ports allowed by the UE.

Third Embodiment

The third embodiment of the present application provides a method for receiving the DCI, which includes: a UE determines the number of the candidate values of the preset indication information borne by the preset indication field in the DCI according to the method as described in the first embodiment; the UE determines the length of the preset indication field according to the number of the candidate values of the preset indication information; and the UE receives the DCI sent by the network device as described in the first embodiment according to the length of the preset indication field.

Fourth Embodiment

The fourth embodiment of the present application provides an apparatus for transmitting the DCI to implement the method of the first embodiment described above. Referring to FIG. 5, the apparatus includes: a first determining device 101 configured to determine the number of the candidate values of the preset indication information borne by the preset indication field in the DCI, the preset indication information including one of or the combination of two of the SRI and TPMI/TRI information; where the SRI characterizes one of the at least one SRS resource configured by the apparatus for a UE, and the TPMI/TRI information characterizes the pre-coding matrix and the rank corresponding to the SRS resource indicated by the SRI; a first encoding device 102 configured to determine the length of the preset indication field according to the number of the candidate values of the preset indication information, and encode the preset indication information according to the length to generate the DCI; and a first sending device 103 configured to send the DCI to the UE.

In one embodiment, the preset indication information includes the combination of the SRI and the TPMI/TRI information, the preset indication information characterizes one of the at least one SRS resource configured for the UE as well as the pre-coding matrix and the rank corresponding to the SRS resource indicated by the SRI; and the first determining device 101 is configured to: determine all values of the SRI, where each value of the SRI characterizes one SRS resource configured for the UE, and different values characterizes different SRS resources; determine the number of the pre-coding matrices available to the UE when sending the SRS on the SRS resource characterized by each value of the SRI; sum the numbers of the available pre-coding matrices corresponding to all the values of the SRI to obtain a first sum value; and take the first sum value as the number of the candidate values of the preset indication information.

In one embodiment, the preset indication information includes the SRI; and the first determining device 101 is configured to: determine the number of the candidate values of the preset indication information as the total number of the at least one SRS resource configured for the UE; or determine the number of the candidate values of the preset indication information as the maximum number of the Tx beam formings supported by the UE; or determine the number of the candidate values of the preset indication information as a preset value.

In one embodiment, the preset indication information includes the TPMI/TRI information; and the first determining device 101 is configured to: determine the number of the pre-coding matrices available to the UE when sending the SRS on each of the configured at least one SRS resource, and establish the mapping between the at least one SRS resource and the number of the available pre-coding matrices before determining the number of the candidate values of the preset indication information borne by the preset indication field in the DCI signal; determine the target SRS resource indicated by the DCI; determine the number of the available pre-coding matrices corresponding to the target SRS resource according to the mapping; and take the number of the available pre-coding matrices corresponding to the target SRS resource as the number of the candidate values of the preset indication information.

In one embodiment, the preset indication information includes the TPMI/TRI information; and the first determining device 101 is configured to: determine the number of the pre-coding matrices available to the UE when sending the SRS on each of the configured at least one SRS resource, determine the maximum of the numbers of the available pre-coding matrices determined according to the at least one SRS resource configured for the UE, and take the maximum number as the number of the candidate values of the preset indication information.

In one embodiment, the preset indication information includes the TPMI/TRI information; and the first determining device 101 is configured to: determine the number of the antenna ports corresponding to each of the at least one SRS resource configured for the UE; determine the SRS resource corresponding to the maximum number of the antenna ports in the at least one SRS resource configured for the UE; and determine the number of the pre-coding matrices available to the UE when sending the SRS on the SRS resource corresponding to the maximum number of the antenna ports as the number of the candidate values of the preset indication information.

In one embodiment, the first determining device 101 is configured to: determine all the values of the TRI corresponding to the first SRS resource that is any one of the at least one SRS resource configured for the UE; determine the number of the available pre-coding matrices corresponding to each value of the TRI; and determine the number of the pre-coding matrices available to the UE when sending the SRS on the first SRS resource according to the number of the available pre-coding matrices corresponding to each value of the TRI.

In one embodiment, the first determining device 101 is configured to: determine all the values of the TRI corresponding to the first SRS resource according to the number of the antenna ports corresponding to the first SRS resource; or determine all the values of the TRI corresponding to the first SRS resource according to the maximum number of the data streams supported by the UE; or determine all the values of the TRI corresponding to the first SRS resource according to the number of the data streams configured by the apparatus for the UE.

In one embodiment, the first determining device 101 is configured to: determine the available pre-coding matrix corresponding to each value of the TRI according to the number of the antenna ports corresponding to the first SRS resource or the maximum number of the antenna ports allowed by the UE.

In one embodiment, the first determining device 101 is configured to: sum the numbers of the available pre-coding matrices corresponding to all the values of the TRI to obtain a second sum value according to the number of the available pre-coding matrices corresponding to each value of the TRI, and take the second sum value as the number of the pre-coding matrices available to the UE when sending the SRS on the first SRS resource; or determine the maximum value of the numbers of the available pre-coding matrices corresponding to all the values of the TRI according to the number of the available pre-coding matrices corresponding to each value of the TRI, multiply the maximum value by the number of all the values of the TRI to obtain a first product, and take the first product as the number of the pre-coding matrices available to the UE when sending the SRS on the first SRS resource.

Fifth Embodiment

The fifth embodiment of the present application provides an apparatus for transmitting the DCI to implement the method in the second embodiment described above, and the apparatus includes: a second determining device configured to determine the number of the candidate values of the preset indication information borne by the preset indication field in the DCI, the preset indication information including TPMI/TRI information or the combination of SRI and TPMI/TRI information; where the SRI characterizes one of the at least one SRS resource configured by the apparatus for a UE, and the TPMI/TRI information characterizes the pre-coding matrix and the rank corresponding to the SRS resource indicated by the SRI; a second encoding device configured to determine the length of the preset indication field according to the number of the candidate values of the preset indication information and encode the preset indication information according to the length to generate the DCI; and a second sending device configured to send the DCI to the UE.

In one embodiment, the preset indication information includes the TPMI/TRI information; and the second determining device is configured to: determine the possible number of the values of the preset indication information according to the number of the antenna ports corresponding to the SRI indicated by the DCI or the maximum number of the antenna ports allowed by the UE.

In one embodiment, the preset indication information includes the combination of the SRI and the TPMI/TRI information; and the second determining device is configured to: determine the possible number of the values of the preset indication information according to the possible number of the values of the SRI and the number of the antenna ports corresponding to each value of the SRI; or determine the possible number of the values of the preset indication information according to the possible number of the values of the SRI and the maximum number of the antenna ports allowed by the UE.

Sixth Embodiment

The sixth embodiment of the present application provides an apparatus for receiving the DCI to implement the method in the third embodiment described above, and the apparatus includes: a third determining device configured to determine the number of the candidate values of the preset indication information borne by the preset indication field in the DCI according to the method as described in the third embodiment, and determine the length of the preset indication field according to the number of the candidate values of the preset indication information; and a receiving device configured to receive the DCI sent by the network device according to the length of the preset indication field.

Figure 6:
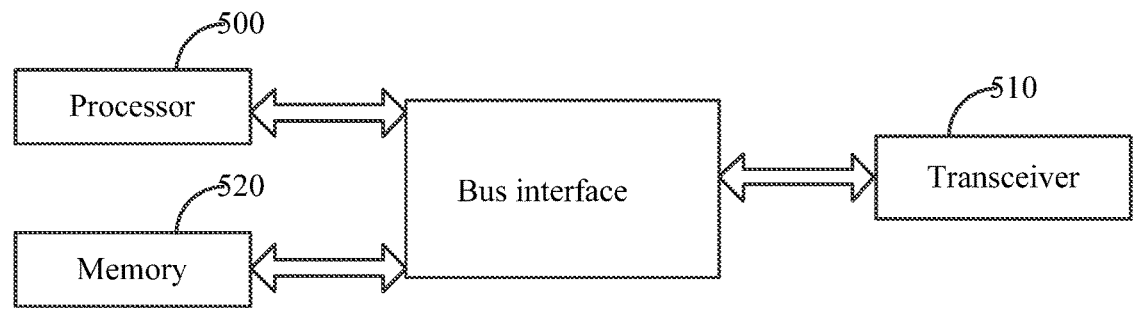
FIG. 6 is a schematic flow chart of another apparatus for transmitting the DCI according to embodiments of the present application.

Referring to FIG. 6, the seventh aspect of the embodiments of the present application provides a device for transmitting the DCI, which includes: a memory 520 configured to store the program instructions; a processor 500 configured to invoke the program instructions stored in the memory 520, and in accordance with the obtained program, perform: determining the number of the candidate values of the preset indication information borne by the preset indication field in the DCI, the preset indication information including one of or a combination of two of the SRI and TPMI/TRI information; where the SRI characterizes one of the at least one SRS resource configured by a network device for a UE, and the TPMI/TRI information characterizes the pre-coding matrix and the rank corresponding to the SRS resource indicated by the SRI; determining the length of the preset indication field according to the number of the candidate values of the preset indication information, and encoding the preset indication information according to the length to generate the DCI; sending the DCI to the UE; and a transceiver 510 configured to receive and transmit the data under the control of the processor 500.

Here, in FIG. 6, the bus architecture can include any numbers of interconnected buses and bridges, and specifically link various circuits of one or more processors represented by the processor 500 and the memory represented by the memory 520. The bus architecture can further link various other circuits such as peripheral device, voltage regulator and power management circuit, which are all well known in the art and thus will not be further described again herein. The bus interface provides an interface. The transceiver 510 can be a plurality of elements, i.e., include a transmitter and a receiver, and provide the devices for communicating with various other devices over the transmission media. The processor 500 is responsible for managing the bus architecture and general processing, and the memory 520 can store the data used by the processor 500 when performing the operations.

The processor 500 can be Central Processing Unit (CPU), Application Specific Integrated Circuit (ASIC), Field-Programmable Gate Array (FPGA) or Complex Programmable Logic Device (CPLD).

Figure 7:
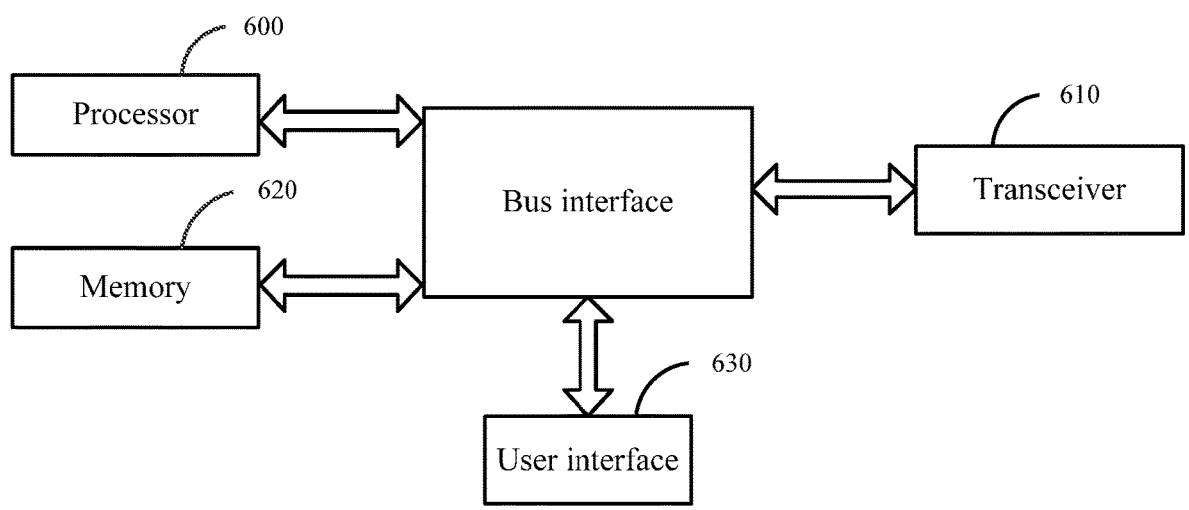
FIG. 7 is a schematic flow chart of an apparatus for receiving the DCI according to embodiments of the present application.

Referring to FIG. 7, the eighth aspect of the embodiments of the present application provides a device for receiving the DCI, which includes: a memory 620 configured to store program instructions; a processor 600 configured to invoke the program instructions stored in the memory 620, and in accordance with the obtained program, perform: determining the number of the candidate values of the preset indication information borne by the preset indication field in the DCI, the preset indication information including one of or a combination of two of the SRI and TPMI/TRI information; wherein the SRI characterizes one of the at least one SRS resource configured by a network device for a UE, and the TPMI/TRI information characterizes the pre-coding matrix and the rank corresponding to the SRS resource indicated by the SRI; determining the length of the preset indication field according to the number of the candidate values of the preset indication information; receiving the DCI according to the length of the preset indication field; and a transceiver 610 configured to receive and transmit the data under the control of the processor 600.

Here, in FIG. 7, the bus architecture can include any numbers of interconnected buses and bridges, and specifically link various circuits of one or more processors represented by the processor 600 and the memory represented by the memory 620. The bus architecture can further link various other circuits such as peripheral device, voltage regulator and power management circuit, which are all well known in the art and thus will not be further described again herein. The bus interface provides an interface. The transceiver 610 can be a plurality of elements, i.e., include a transmitter and a receiver, and provide the devices for communicating with various other devices over the transmission media. For different user equipments, the user interface 630 can also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 can store the data used by the processor 600 when performing the operations.

In one embodiment, the processor 600 can be Central Processing Unit (CPU), Application Specific Integrated Circuit (ASIC), Field-Programmable Gate Array (FPGA) or Complex Programmable Logic Device (CPLD).

The methods provided by the embodiments of the present application can be applied to the terminal devices, and can also be applied to the network devices.

Here, the terminal device can also be referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device can be a base station (e.g., access point), which means the device in the access network communicating with the wireless terminal via one or more sectors over the air interface. The base station can be used to perform the inter-conversion between the received air frame and the IP packet, and used as the router between the wireless terminal and the rest of the access network, wherein the rest of the access network may include Internet Protocol (IP) networks. The base station can further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. This aspect is not limited in the embodiments.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

To sum up, one or more technical solutions provided in the embodiments of the present application have at least the following technical effects or advantages.

1. The embodiments of the present application propose the specific implementation methods of encoding the SRI and TPMI/TRI, and specifically propose the implementations of separately encoding and jointly encoding the SRI and TPMI/TRI. In the case of separate encoding, the field length required to encode the SRI is determined according to the number of the candidate values of the SRI, and the field length required to encode the TPMI/TRI information is determined according to the number of the candidate values of the TPMI/TRI information; and in the case of joint encoding, the field length required for the joint encoding is determined according to the number of the candidate values of the SRI and the number of the candidate values of the TPMI/TRI information. This solution solves the technical problem that there is no method for encoding the SRI and TPMI/TRI information in the existing protocols and communication systems effectively.

2. The embodiments of the present application propose many specific implementation methods of determining the number of the candidate values of the SRI, the number of the candidate values of the TPMI/TRI information, and the number of the candidate values of the combination of the SRI and TPMI/TRI information, to further perfect the technical solutions for encoding the SRI and TPMI/TRI information.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the present application have been described, those skilled in the art can make additional alterations and modifications to these embodiments once they learn about the basic creative concepts. Thus the attached claims are intended to be interpreted to include the embodiments as well as all the alterations and modifications falling within the scope of the present application.

Evidently those skilled in the art can make various modifications and variations to the embodiments of the present application without departing from the spirit and scope of the embodiments of the present application. Thus the present application is also intended to encompass these modifications and variations therein as long as these modifications and variations to the embodiments of the present application come into the scope of the claims of the present application and their equivalents.

What is claimed is:

1. A method for receiving Downlink Control Information (DCI) comprising:
   determining, by a User Equipment (UE) a candidate value of preset indication information borne by a preset indication field in the DCI; wherein the preset indication information comprises at least one of Sounding reference signal Resource Indicator (SRI) or Transmission Precoding Matrix Indicator (TPMI)/Transmission Rank Indicator (TM) information, the SRI indicates one of at least one Sounding Reference Signal (SRS) resource configured by a network device for the UE, and the TPMI/TRI information indicates a pre-coding matrix and a rank corresponding to the SRS resource indicated by the SRI;
   receiving, by the UE, the DCI; and
   decoding, by the UE, the preset indication information according to the candidate value of the preset indication information;
   wherein the preset indication information comprises the TPMI/TRI information, and the decoding the preset indication information according to the candidate value of the preset indication information, comprises at least one of following operations:
- determining the number of antenna ports corresponding to each of the at least one SRS resource configured for the UE; determining a length of the preset indication field according to a maximum value of the numbers of the antenna ports; and decoding the preset indication information according to the length;
- determining a length of the preset indication field according to the maximum number of data streams configured by the network device for the UE, and decoding the preset indication information according to the length;
- determining a length of the preset indication field according to the maximum number of data streams supported by the UE, and decoding the preset indication information according to the length; or
- determining a length of the preset indication field according to the number of antenna ports corresponding to the at least one SRS resource configured by the network device for the UE, and decoding the preset indication information according to the length.

2. The method according to claim 1, wherein the preset indication information comprises the SRI and the TPMI/TRI information; the determining, by the UE, the candidate value of the preset indication information borne by the preset indication field in the DCI, comprises: determining all values of the SRI; determining a pre-coding matrix available to the UE when sending an SRS on an SRS resource indicated by each value of the SRI; and taking the pre-coding matrix as the candidate value of the preset indication information; or the preset indication information comprises the TPMI/TRI information, and before determining, by the UE, the candidate value of the preset indication information borne by the preset indication field in the DCI, the method further comprises: determining a pre-coding matrix available to the UE when sending an SRS on each of the configured at least one SRS resource; and establishing a mapping between a SRS resource and an available pre-coding matrix; the determining, by the UE, the candidate value of the preset indication information borne by the preset indication field in the DCI, comprises: determining a target SRS resource indicated by the DCI; determining an available pre-coding matrix corresponding to the target SRS resource according to the mapping; and taking the available pre-coding matrix corresponding to the target SRS resource as the candidate value of the preset indication information.

3. The method according to claim 2, wherein determining the pre-coding matrix available to the UE when sending the SRS on each of the configured at least one SRS resource, comprises:
- determining all values of TRI corresponding to a first SRS resource that is any one of the at least one SRS resource configured for the UE;
- determining an available pre-coding matrix corresponding to each value of the TM; and
- determining the pre-coding matrix available to the UE when sending an SRS on the first SRS resource according to the available pre-coding matrix corresponding to each value of the TM.

4. The method according to claim 3, wherein the determining all values of the TM corresponding to the first SRS resource, comprises at least one of following operations: determining all the values of the TM corresponding to the first SRS resource according to the number of antenna ports corresponding to the first SRS resource; determining all the values of the TM corresponding to the first SRS resource according to the maximum number of data streams supported by the UE; or determining all the values of the TRI corresponding to the first SRS resource according to the number of data streams configured by the network device for the UE;

the determining the available pre-coding matrix corresponding to each value of the TRI, comprises: determining the available pre-coding matrix corresponding to each value of the TM according to the number of antenna ports corresponding to the first SRS resource or the maximum number of antenna ports allowed by the UE;

determining the pre-coding matrix available to the UE when sending the SRS on the first SRS resource according to the available pre-coding matrix corresponding to each value of the TM, comprises: taking a set of available pre-coding matrices corresponding to all values of the TM as the pre-coding matrix available to the UE when sending the SRS on the first SRS resource according to the available pre-coding matrix corresponding to each value of the TRI.

5. The method according to claim 1, wherein the decoding the preset indication information according to the candidate value of the preset indication information, comprises:
- determining, by the UE, a length of the preset indication field according to the number of candidate values of the preset indication information; and
- decoding the preset indication information according to the length.

6. The method according to claim 5, wherein the preset indication information comprises the SRI;
- the number of candidate values of the preset indication information is the total number of the at least one SRS resource configured for the UE; or
- the number of candidate values of the preset indication information is the maximum number of Tx beam formings supported by the UE; or
- the number of candidate values of the preset indication information is a preset value.

7. The method according to claim 5, wherein the preset indication information comprises the TPMI/TRI information, and the determining, by the UE, the length of the preset indication field according to the number of candidate values of the preset indication information, comprises:
- determining the length of the preset indication field as a length of the preset indication field corresponding to a SRS resource of which the number of pre-coding matrices is largest in the at least one SRS resource configured for the UE; or
- determining all values of TRI corresponding to a first SRS resource that is any one of the at least one SRS resource configured for the UE; determining a maximum value of the numbers of available pre-coding matrices corresponding to all the values of the TM according to the number of available pre-coding matrices corresponding to each value of the TRI; multiplying the maximum value by the number of all the values of the TRI, to obtain a first product; and taking the first product as the number of candidate values of the preset indication information when the UE sends an SRS on the first SRS resource.

8. The method according to claim 1, wherein the preset indication information comprises the TPMI/TRI information, and the determining the candidate value of the preset indication information borne by the preset indication field in the DCI, comprises: determining the candidate value of the preset indication information according to the number of antenna ports corresponding to the SRI indicated by the DCI or the maximum number of antenna ports allowed by the UE; or the preset indication information comprises the SRI and the TPMI/TRI information, and the determining the candidate value of the preset indication information borne by the preset indication field in the DCI, comprises: determining the candidate value of the preset indication information according to the possible number of values of the SRI and the number of antenna ports corresponding to each value of the SRI; or determining the candidate value of the preset indication information according to the possible number of values of the SRI and the maximum number of antenna ports allowed by the UE.

9. A device for receiving Downlink Control Information (DCI) wherein the device comprises:
a memory configured to store program instructions; and
a processor configured to invoke the program instructions stored in the memory and perform the method according to claim 1 according to the obtained program.

* * * * *